Jan. 8, 1963  J. A. PERRY, JR  3,072,209
MOUNTING FOR FORCE MEASURING DEVICE
Filed Nov. 16, 1959  3 Sheets-Sheet 1

INVENTOR.
JOSEPH A. PERRY Jr.
BY James C. Nemmers
ATTORNEY

Jan. 8, 1963 J. A. PERRY, JR 3,072,209
MOUNTING FOR FORCE MEASURING DEVICE
Filed Nov. 16, 1959 3 Sheets-Sheet 2

INVENTOR.
JOSEPH A. PERRY Jr.
BY
ATTORNEY

Jan. 8, 1963  J. A. PERRY, JR  3,072,209
MOUNTING FOR FORCE MEASURING DEVICE
Filed Nov. 16, 1959  3 Sheets-Sheet 3

INVENTOR.
JOSEPH A. PERRY Jr.
BY
ATTORNEY

United States Patent Office 3,072,209
Patented Jan. 8, 1963

3,072,209
MOUNTING FOR FORCE MEASURING DEVICE
Joseph A. Perry, Jr., Cedar Rapids, Iowa, assignor to Cherry-Burrell Corporation, Cedar Rapids, Iowa, a corporation of Delaware
Filed Nov. 16, 1959, Ser. No. 853,199
4 Claims. (Cl. 177—179)

This invention relates generally to a mounting for force measuring devices and more particularly to such a device adapted to be inserted in the legs of a bulk container or the like to eliminate non-load forces from being communicated to such force measuring devices.

In systems for measuring the weight of heavy structures and also in processing systems controlled by weight changes in a container caused by addition or removal of the product, it is customary to employ one or more load measuring units or cells mounted either in the weighing apparatus itself or in the supporting structure of the container being weighed. In all of these systems a high degree of accuracy is either desirable or required. For example, load cells mounted on the supports of one or more bulk containers forming part of a batching system must be capable of accurately determining the quantity of a product being loaded in or loaded out of a particular container. Unfortunately, variations in the temperature of the container due to changes in either the ambient temperature or the temperature of the product in the container often cause the container to expand and contract. Also, slight distortions may occur in the container as the weight of its contents changes. Although these temperature and weight-caused changes are relatively small and rarely perceptible to the unaided eye, the changes can cause the load cells to give erratic and inaccurate results in the weighing system.

Inaccuracies in weight measurement are most likely to occur when the supporting structure for the container is rigid since the supporting structure will be subjected to lateral or side forces as it resists the deflections. If a load cell is attached rigidly between the container and its support, the cell will be subjected not only to the vertical forces but also to these lateral forces. The load cell designer then has the option of either building a cell large enough and strong enough to resist these lateral forces or he may in some way attempt to substantially eliminate them. Many devices attempting to minimize these lateral forces can be found in the prior art. However, I have found all of these devices to have one or more shortcomings that decrease their accuracy.

It is therefore an object of the present invention to eliminate substantially all the side loading or lateral force on a load cell mounted on a structure to be weighed. I propose to eliminate all lateral forces caused either by temperature variations or deflections due to other external causes.

It is another object of my invention to provide a mounting for a load cell which will not only substantially eliminate lateral forces on the cell but will also minimize inaccuracies in the cell caused by angularity of the force to be measured, thereby further increasing the accuracy and reliability of the load cell and the weighing system.

It is a further object of my invention to provide a load cell mounting that will free the cell from those normal movements of the supported structure that would otherwise cause a change in the center of force applied to the cell.

It is a further object to provide a load cell mounting that occupies a minimum of space, is simple, and is relatively inexpensive to manufacture. My novel mounting also reduces the complexity of design and thereby the cost of the cell itself without sacrificing the accuracy and reliability that can be attained with a load cell under strictly controlled conditions.

These and other objects and advantages of my invention can be readily appreciated by those skilled in the art from a consideration of the following description taken in connection with the accompanying drawings in which.

Figure 1:
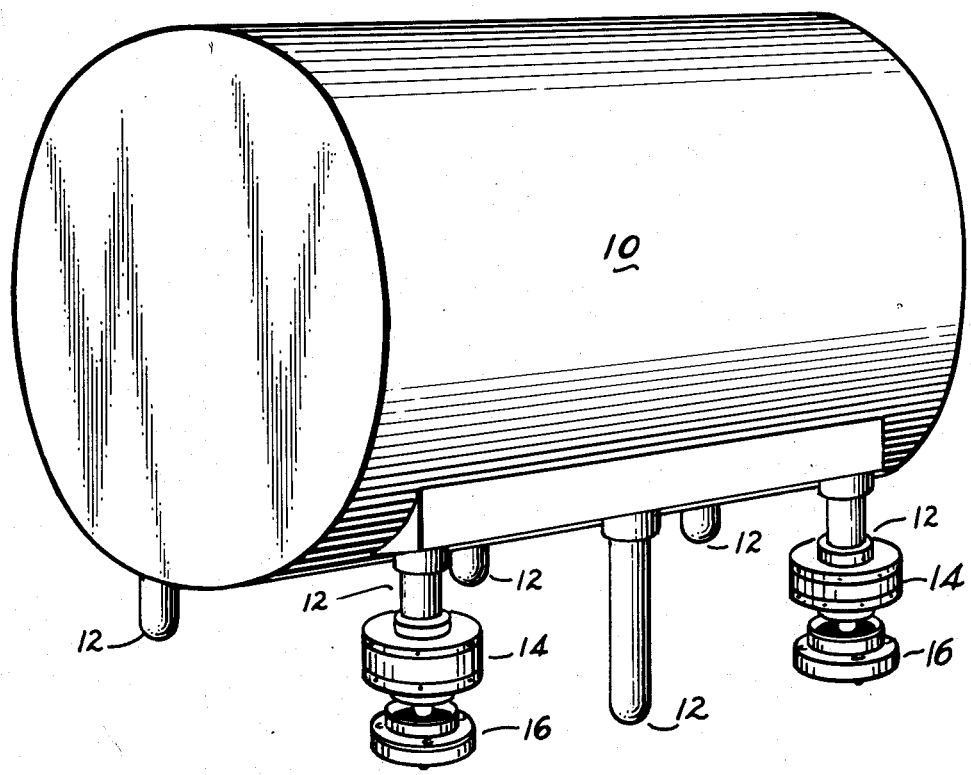
FIGURE 1 is a perspective view of a large tank showing two load cells and my novel mountings in position as a part of the supporting structure of the tank.
Figure 2:
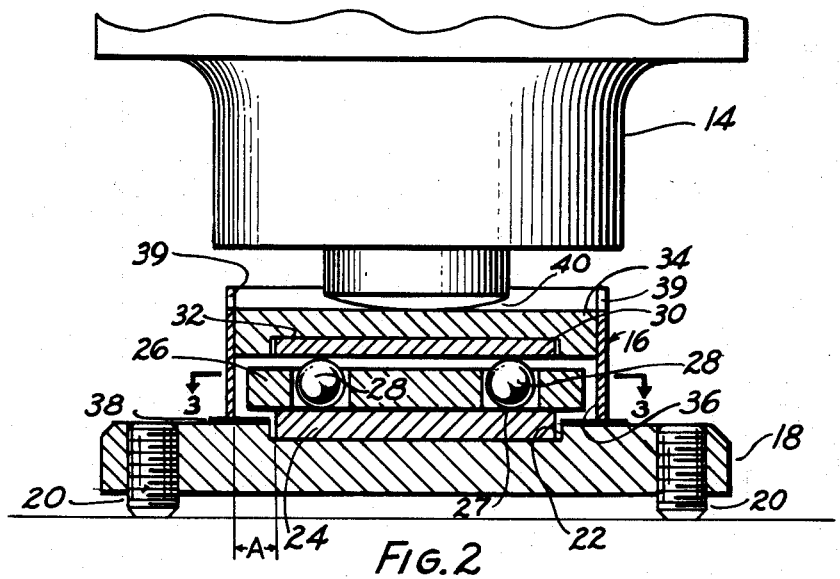
FIGURE 2 is a sectional view of the load cell mounting.

For the purpose of illustrating the particular embodiments of my invention which are disclosed herein, I have shown in FIGURE 1 a typical use for my invention, that of measuring the weight of the contents of a large tank. My novel mounting is preferably used in connection with load cells and brackets of the type disclosed in my co-pending applications, Serial No. 641,664, filed February 21, 1957, now abandoned, and Serial No. 571,974, filed March 16, 1956, now Patent Number 2,980,414. However, the mounting is well suited for use with almost any type of load cell and bracket. Referring to FIGURES 1 and 2, a tank 10 is supported by legs 12, two of which are combined with load cells 14. The load cells 14 each rest on a mounting structure which is indicated generally by reference numeral 16.

The mounting 16 is comprised of a base member or floor plate 18 that may be leveled by means of three adjusting screws 20 equally spaced around its outer edge. Base member 18 has a circular-shaped depression 22 in its top side to receive a corresponding circular-shaped, hardened steel plate 24. A retainer 26 contains a plurality of holes 27 that receive a plurality of hardened steel balls 28. The balls 28 bear and roll on the bearing plate 24 and on a second bearing plate 30 that rests on top of the steel balls 28 and is received in a circular recess 32 formed in the bottom of the bearing cap 34. The bearing plate 30 is also preferably of hardened steel.

A cylindrical-shaped bearing cap sleeve 36 encloses the bearing cap 34, the retainer 26 and bearing plate 24. The bottom edge of sleeve 36 contacts an annular gasket 38 that rests on the base member 18. The gasket 38 has a circular hole in its center that is of the same diameter as the recess 22. The bearing cap 34 may be somewhat recessed with respect to the top edge of the sleeve 36 to form a shallow cup and the sleeve 36 may therefore have notches or holes 39 formed near the top to allow drainage of any liquid which may become trapped in this cup. The cap 34 fits snugly in the sleeve 36 so as to prevent moisture from entering and deteriorating the bearing plates 24 and 30 and the steel balls 28. Likewise, the engagement of the sleeve 36 against the gasket 38 is sufficiently a further seal to keep moisture away from the steel balls 28.

As shown in FIGURE 2, the load cell 14 has a spherical bearing surface 40 that rests on top of the bearing cap 34. Thus, in the event of any movement in the tank 10 due to temperature changes or other external forces, the load cell 14 will shift with the tank 10 as the bearing cap 34 rolls on the steel balls 28. Since the steel balls 28 have practically no resistance to lateral force, the mounting 16 will adjust readily to external forces and thus the load cell 14 will be substantially free from any side loading.

As shown in FIGURE 2, the amount of movement of cell 14 relative to mounting 16 is limited to the distance "A," which is the distance the sleeve 36 can move laterally before contacting the bearing plate 24. Since the bearing plates 24 and 30, the bearing cap 34, and the sleeve 36 are all circular, this amount of movement is permitted in any lateral direction. It is obvious that the mounting structure 16 may be modified to provide for any amount of movement within reasonable limits to suit the needs of a particular installation.

It will be noted that the bearing surface 40 of the load cell 14 is spherical. The purpose of this is to compensate for any angularity in the legs 12 thereby assuring that the center of force through the load cell will always remain the same regardless of the amount of deflection in the tank 10.

Also, I prefer to make the bearing surface 40 so that its center of curvature is at the center of the load cell 14. This is important when the mounting 16 is used with certain load cells including the type of cell shown and described in my co-pending application referred to above.

Figure 3:
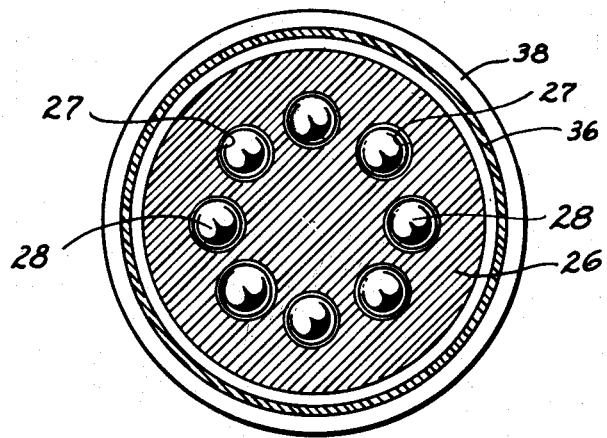
FIGURE 3 is a sectional view taken on the line 3—3 of FIGURE 2.
Figure 4:
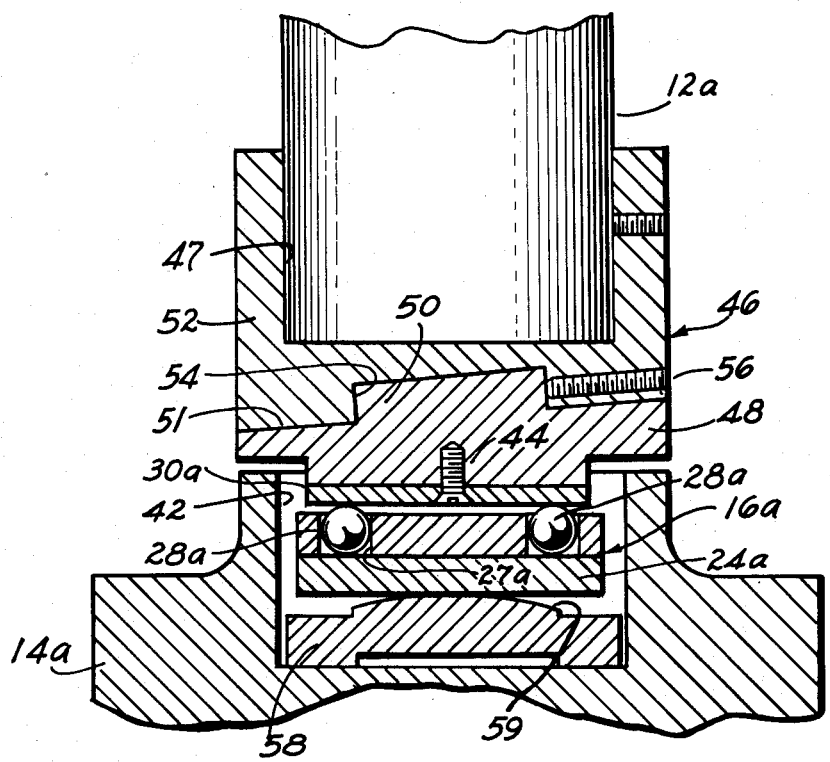
FIGURE 4 is a sectional view similar to FIGURE 2 but showing the mounting slightly modified for use on top of the load cell.

FIGURE 4 shows my novel mounting structure in a position between the cell and the tank. In describing this embodiment of my invention, parts corresponding to those of the first embodiment will receive the same reference numerals followed by the subscript "a." In FIGURE 4, the mounting structure 16a is received almost entirely within a cylindrical recess 42 at the top of the cell 14a. The mounting structure 16a, similar to that shown in FIGURES 2 and 3, consists of a hardened steel bearing plate 24a upon which rests a plurality of hardened steel balls 28a that are received in holes 27a of a retainer 26a. A second hardened steel bearing plate 30a rests on top of the steel balls 28a. In the embodiment shown in FIGURE 4, the mounting structure 16a is adapted to receive the leg 12a of a tank similar to the tank shown in FIGURE 1. To accommodate the leg 12a, the top bearing plate 30a is secured by means a machine screw 44 to a cup-shaped assembly 46 that is adapted to receive the leg 12a in cylindrical hole 47.

The assembly 46 comprises a lower portion 48 that has a circular boss 50 projecting from its center, and an upper portion 52 that has a cylindrical-shaped recess 54 corresponding to the boss 50. The top surface of boss 50 and the remaining top surface 51 of the lower portion 48 are tapered to correspond to the tapered bottom surface of the upper portion 52. This permits the assembly 46 to be adjusted to receive a leg 12a from various angles. The set screw 56 maintains the two portions 48 and 52 in their selected relative positions.

As shown in FIGURE 4, and similar to the embodiment shown in FIGURES 2 and 3, I prefer to have one of the bearing surfaces between the load cell 14a and the mounting structure 16a adapted to compensate or account for angularity or misalignment of the load. I have shown this accomplished by using an insert block 58 whose top surface 59 is spherical. The block 58 is received in the cylindrical recess 42 between the mounting structure 16a and the load cell 14a. It is obvious, of course, that the same results can be accomplished by rounding the bottom surface of the bottom bearing plate 30a. However, I prefer the structure as shown to promote standardization of parts among the various embodiments of the mounting structure.

The embodiment of FIGURE 4 operates identical to that of FIGURES 2 and 3 and has all the advantages of the first embodiment. The basic difference between the two embodiments is that the second embodiment is used where it is necessary or desirable to place the cell below the mounting structure.

Figure 5:
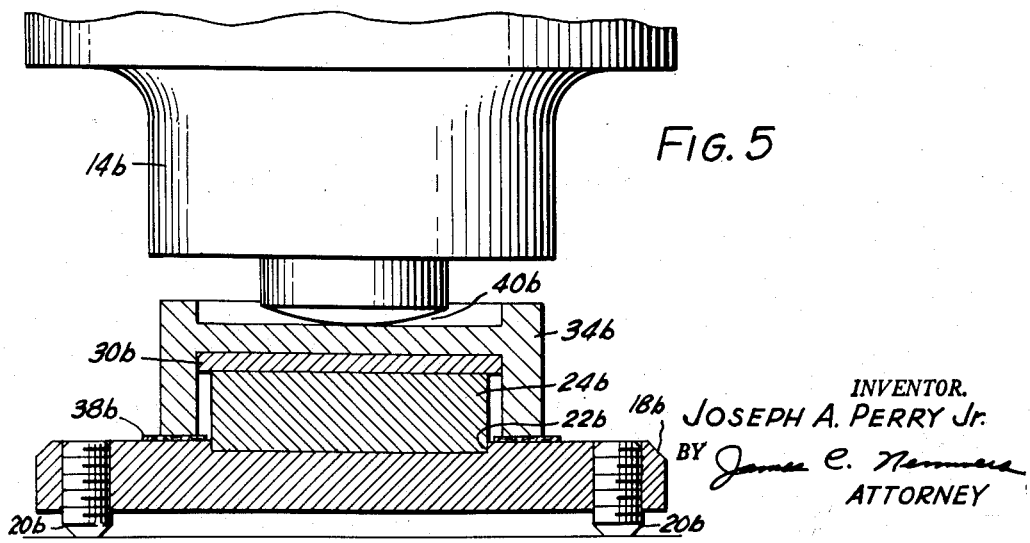
FIGURE 5 is a sectional view, similar to FIGURE 2, showing another embodiment of my invention designed for heavy loads with the cell mounted on top of the mounting structure.

Referring now to the embodiment shown in FIGURE 5, parts corresponding to those of the fist two embodiments will be given the same reference numerals followed by the subscript "b." In this third embodiment the base member or floor plate 18b is mounted on a plurality of adjusting screws 20b. A circular recess 22b in the center of floor plate 18b receives a bearing plate 24b. Mounted directly on top of the bearing plate 24b is a second bearing plate 30b. A bearing cap 34b positions plate 30b, and the spherical bearing surface 40b of load cell 14b rests upon the top surface of the bearing cap 34b. A doughnut-shaped gasket 38b provides a seal between floor plate 18b and bearing cap 34b. In this embodiment, which is preferably used when the loads to be measured become too great to practically use the ball bearing design of FIGURES 2, 3 or 4, sliding action occurs between the two bearing plates 24b and 30b. To minimize friction between the two plates, it is, of course, necessary to use a suitable pressure lubricant between their surfaces.

This embodiment operates similar to that of the first two embodiments and has all the advantages that I have set forth above, namely, elimination of substantially all side loading of the cell, elimination of inaccuracies due to angularity of the force to be measured, and maintenance of the line of force through the center of the cell regardless of the amount of movement of the structure being weighed. It is also apparent that an arrangement similar to that shown in FIGURE 4, where the mounting structure is on top of the cell, but utilizing sliding action rather than rolling action between the bearing plates may also be used where appropriate.

From the foregoing disclosure of the several embodiments, it can be readily seen that I have provided an effective, yet simple, and inexpensive means of overcoming the problems of side loading of the cell due to expansion, contraction or deflection of the supported structure. It is, of course, obvious that various changes and modifications of construction and design may be made by those skilled in the art without departing from the spirit and scope of my invention as set forth in the appended claims.

I claim:

1. In combination with a load-measuring device secured and fixed from movement relative to the supporting structure of the load to be measured, a mounting device comprising a base member having a circular recessed portion on top, a lower cylindrical bearing member positioned in said recessed portion, said bearing member being of a smaller diameter than said circular recess, an upper bearing member positioned above said lower bearing member and movable relative thereto, means to reduce the friction between said bearing members, a cylindrical cover for said bearing members, said cover having side portions that extend downwardly toward said base member and surround said lower bearing member, said cover serving to position the upper bearing member and to limit relative movement between said upper and lower bearing members, and a spherical-shaped bearing means connecting the supporting structure and said mounting device, said spherical-shaped bearing means resting on the top of said upper bearing member.

2. The combination of claim 1 in which the means to reduce the friction between said bearing members comprises a plurality of balls interposed between said members to provide for relative movement therebetween.

3. In the combination of claim 1, a gasket seated on said base member and engaged by the bottom edge of the side portions of said cover to minimize the entrance of foreign matter into said mounting device.

4. The combination of claim 1 in which the center of curvature of the spherical bearing means is at the center of the load-measuring device.

References Cited in the file of this patent

UNITED STATES PATENTS

| | | |
|---|---|---|
| 1,634,084 | Ruths | June 28, 1927 |
| 2,793,850 | Eckmann | May 28, 1957 |
| 2,793,851 | Ruge | May 28, 1957 |
| 2,960,328 | Tate | Nov. 15, 1960 |

OTHER REFERENCES

Emery Way-Pac System (Bulletin 582), Dec. 8, 1958, The Emery Co., New Canaan, Conn.